United States Patent
Zhang et al.

(10) Patent No.: US 7,660,498 B2
(45) Date of Patent: Feb. 9, 2010

(54) MULTIMODE REFLECTIVE TAP

(75) Inventors: Kevin Zhang, Fremont, CA (US);
Guojun Lai, Pudong (CN); Youjian Wu, Pudong (CN); Fahua Lan, Pudong (CN)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 12/103,365

(22) Filed: Apr. 15, 2008

(65) Prior Publication Data

US 2009/0257714 A1 Oct. 15, 2009

(51) Int. Cl.
 *G02B 6/32* (2006.01)
(52) U.S. Cl. ............... 385/33; 385/31; 385/34; 385/74
(58) Field of Classification Search ............ 385/31–35, 385/73–74
See application file for complete search history.

(56) References Cited

U.S. PATENT DOCUMENTS

| 7,068,883 | B2 * | 6/2006 | Ludington et al. | 385/33 |
| 7,076,132 | B2 * | 7/2006 | Ryall et al. | 385/33 |
| 7,231,115 | B2 * | 6/2007 | Seto et al. | 385/33 |
| 2003/0103725 | A1 * | 6/2003 | Li | 385/34 |

FOREIGN PATENT DOCUMENTS

CN 201017130 Y * 2/2008

* cited by examiner

*Primary Examiner*—Hemang Sanghavi
(74) *Attorney, Agent, or Firm*—Workman Nydegger (57) ABSTRACT

A glass optical reflective tap is described that optically connects two optical fibers and may tap a portion of the light that is being communicated between the optical fibers. In one embodiment of the invention, the optical filter includes two D-lenses that operate as focusing or collimator lenses. The first D-lens focuses an optical signal onto a tap filter that allows a majority of the light within an optical signal to pass and also reflects a small portion of optical signal light to a reflective port. The second D-lens focuses the passed light into a transmission port of an optical fiber.

19 Claims, 10 Drawing Sheets

500

Optical Reflective Tap

Optical Reflective Tap
Figure 5

Glass Optical Reflective Tap
Figure 6

Focusing Lenses and Tap Filter
Figure 7

D Lens
Figure 8

D Lens
Figure 9

Optical Reflective Tap Filter with D Lens
Figure 10

MULTIMODE REFLECTIVE TAP

CROSS REFERENCE TO RELATED APPLICATION

This application is related to U.S. Pat. No. 7,295,730, entitled "Glass Package for an Optical Device," filed on Dec. 2, 2005, which application is incorporated by reference in its entirety.

BACKGROUND

A. Technical Field

The present invention relates generally to optical networking technology, and more particularly, to a glass-packaged multimode reflective tap.

B. Background of the Invention

The development of optical networking technologies has provided large amounts of network capacity on which data may be communicated. This increased capacity has facilitated the development of high bandwidth applications, including multimedia, voice and video applications, which require large amounts of data to be communicated between network clients. Furthermore, other bandwidth-hungry applications are continually being developed to take advantage of the capacity provided by optical networks.

Wavelength division multiplexing technology, including dense wavelength division multiplexing and coarse wavelength multiplexing, is a significant technological advancement that has resulted in an increase of bandwidth in optical networks. A wavelength division multiplexer launches multiple data channels or wavelengths within a single optical fiber.

These channels are subsequently demultiplexed at a receiver and routed within the network. The number of channels within a WDM network is the primary determinant in the amount of bandwidth within an optical network.

WDM technology also allows a service provider to expand optical network bandwidth without building out or otherwise physically expanding the network infrastructure. In particular, wavelength division multiplexing allows network capacity to be increased by transmitting additional wavelengths in the network. The number and specific wavelengths that may be communicated on the network are limited by the network configuration, the type of optical fiber and optical components within the network.

The management of optical power in a WDM network is important to ensure signal integrity through the network. Various monitoring components and analysis devices may be employed within the network to track and adjust optical power within the various network connections and links.

One such optical component is an optical tap that splits a portion of light from an optical signal. This tapped light may be transmitted to a processing device or controller that analyzes the tapped light. For example, the tapped light may be analyzed to determine a power level of the optical signal based on a known optical power ratio of the optical signal and the tapped signal portion.

An optical tap typically includes a tap filter that reflects a majority of the light within an optical signal and diverts (or reflects) a small portion of the light. This diverted light is typically transmitted out a port of the optical tap for subsequent analysis. The components within the optical tap are surrounded by a housing that protects the components and secures the components within their relative positions.

Figure 1:
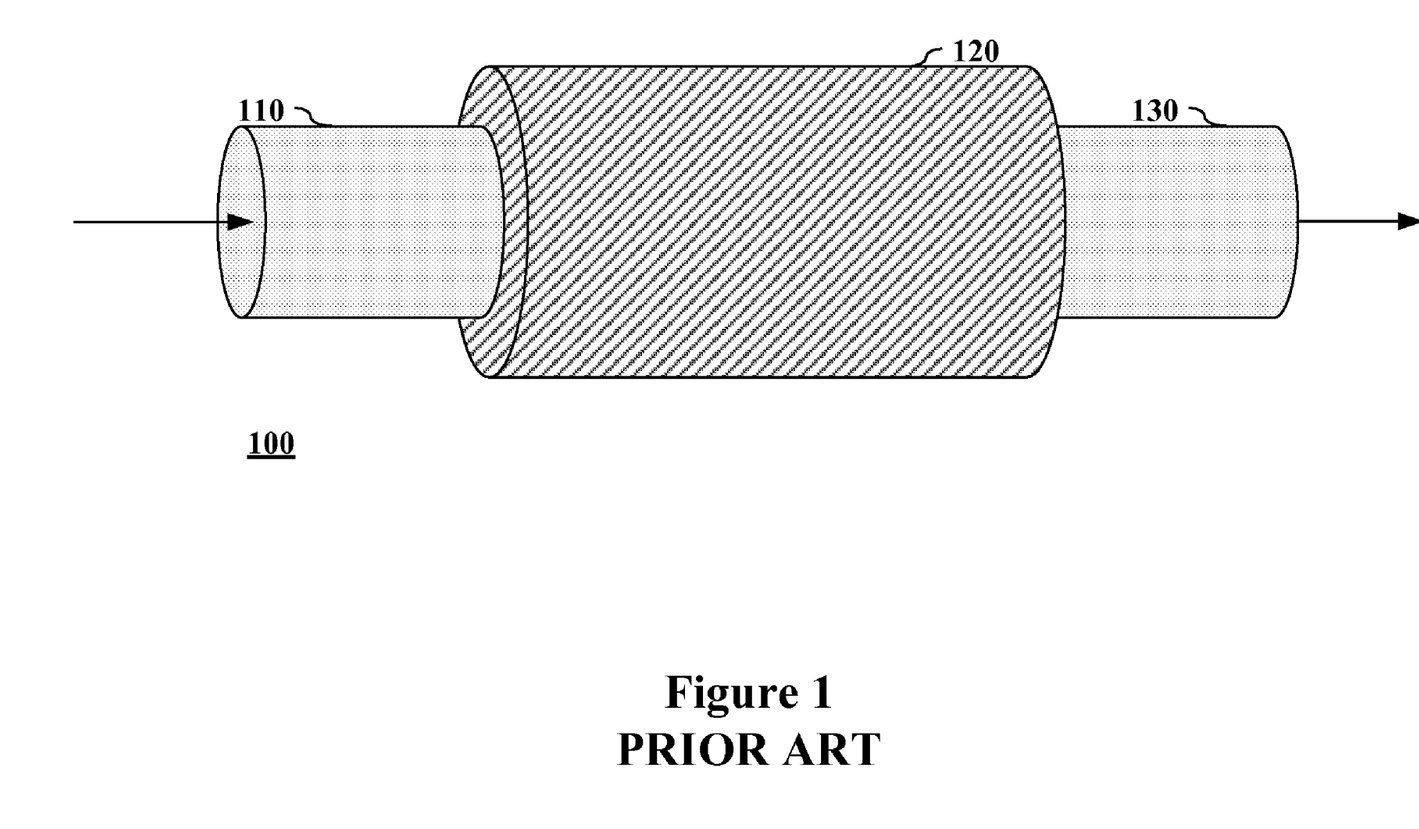
FIG. 1 is an illustration of a prior art metallic optical tap.

FIG. 1 illustrates an exemplary housing 100 of an optical tap in which these components may be positioned. The housing 100 includes two metallic collimators tubes 110, 130 and a soldering tube 120 that are generally connected by lead-based solder. The first metallic collimator tube 110 and the second metallic collimator tube 130 contain fiber pigtails and coupling lenses. The soldering tube 120 contains a tap chip, tap cylinder and a tap holder.

An incident light passes through a fiber pigtail in the first metallic collimator tube 110 and is focused onto a coating film on the tap filter, located in the holder cylinder within the soldering tube 120, by the first coupling lens. A majority of the light passes through the tap filter. After the single or group of wavelengths pass through the tap filter, the second coupling lens focuses the passed light into the transmission port of the other fiber pigtail in the second metallic collimator tube 130. A reflected portion of the light from the tap filter is reflected back and into a reflection port of the fiber pigtail by the first coupling lens. It is important that the components within the housing 100 are properly aligned.

The metallic housing 100 may affect the performance of the optical tap filter as it expands and contracts in relation to temperature. In particular, the coefficient of thermal expansion ("CTE") of the metal and solder of the housing 100 makes it relatively sensitive to temperature. The expansion/contraction of the housing 100, caused by significant changes in temperature, may affect the position and/or shape of components therein, which may reduce the performance of the filter.

The metallic tubes and lead-based solder within the housing 100 may also contain hazardous materials that are prohibited by various standards or directives. For example, Directive 2002/95/EC of the European Parliament and of the Council of 27 Jan. 2003 on the restriction of the use of certain hazardous substances in electrical and electronic equipment ("RoHS") which prohibits certain material, including lead, from being within the optical filter must be complied with in order to sell certain electronic components in Europe. Other metallic substances are also banned by RoHS or other standards.

The focusing lenses may affect the performance and size requirements of the optical filter. Various types of lenses have been employed as the coupling lenses within optical tap filters including C-lenses, gradient index ("GRIN") lenses, and A-lenses. Each of these lenses has certain optical characteristics that are both advantageous and disadvantageous when applied to the optical filter.

Figure 2:
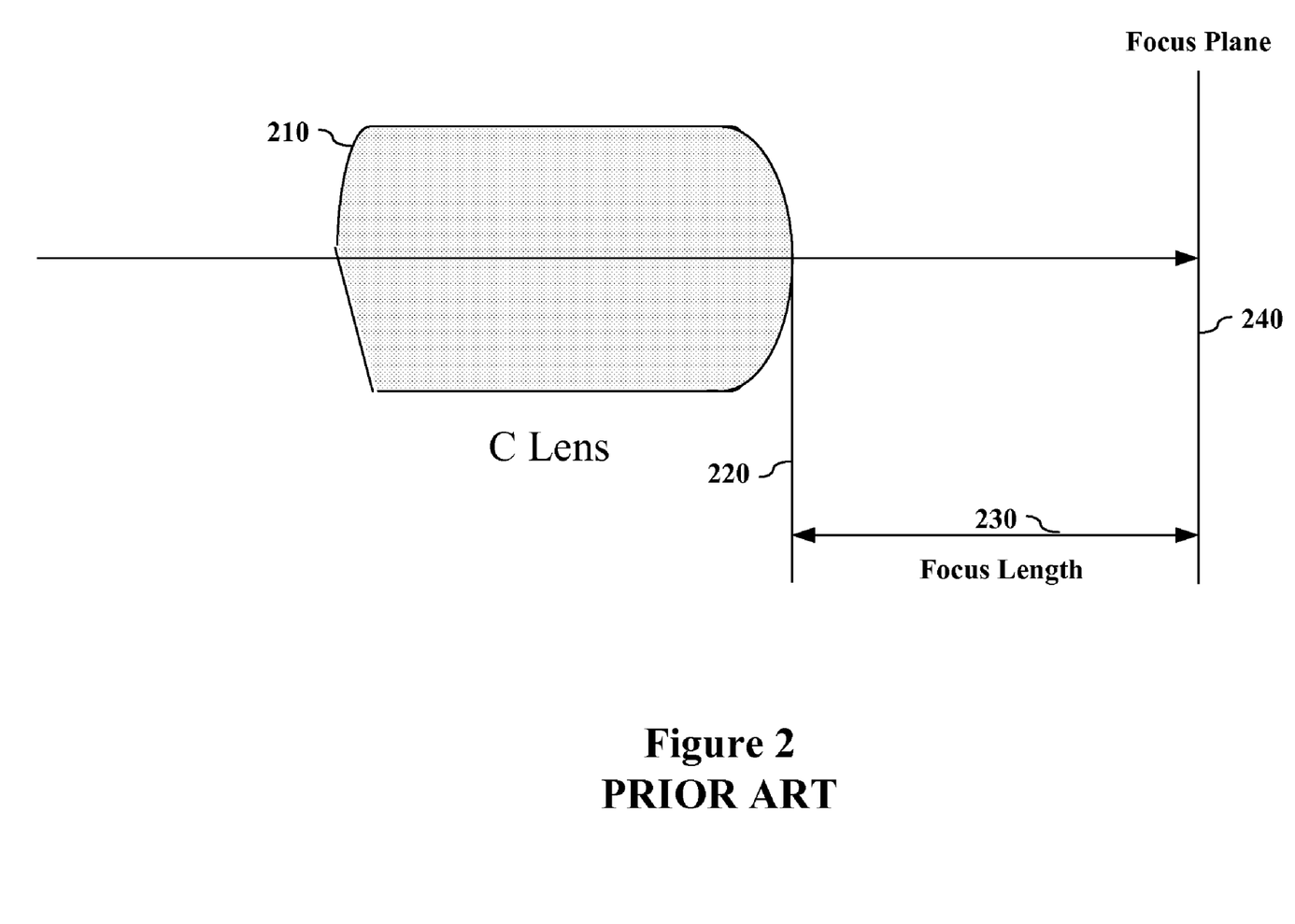
FIG. 2 is an illustration of a C lens and certain optical characteristics thereof.

FIG. 2 illustrates an exemplary C-lens that may be used within the optical tap filter. The C-lens 210 receives an incident light beam and focuses the light on a focus plane 240. The C-lens 210 has a focus length 230 that is defined as the distance between a focusing surface 220 of the C-lens 210 and the focus plane 240. The focus length 230 for the C-lens is typically about 1.9 millimeters. A C-lens 210 typically has a relatively low insertion loss and a CTE of less than $6 \times 10^{-6}$/C.

In order for the C-lens 210 to operate properly within a tap filter, the C-lens 210 must be properly located relative to its focus length 230 and the focus plane 240. Accordingly, the relatively large focus length 230 limits the amount of any reduction in size of the tap filter.

Figure 3:
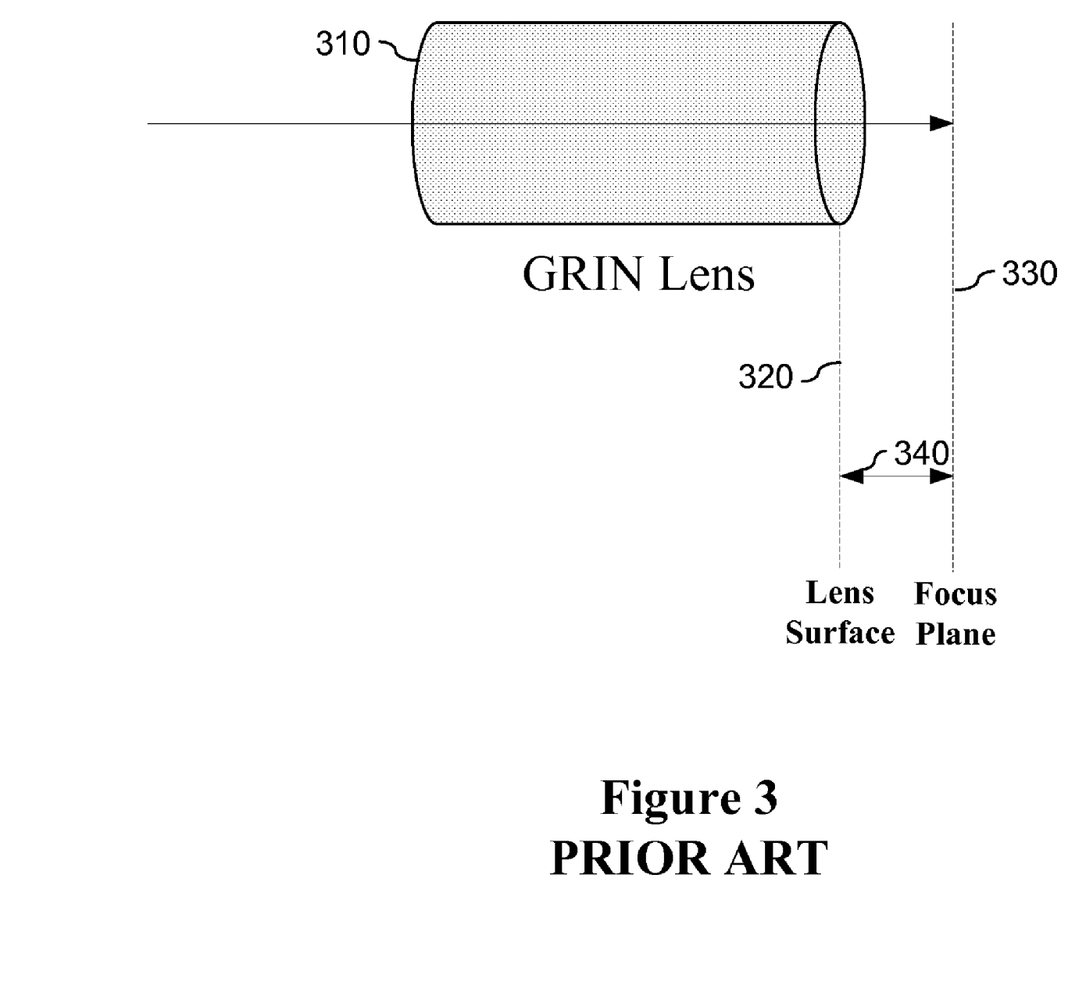
FIG. 3 is an illustration of a GRIN lens and certain optical characteristics thereof.

FIG. 3 illustrates an exemplary GRIN lens that may be used within the optical tap filter. The GRIN lens 310 receives an incident light beam and focuses the light on a focus plane 330. The GRIN lens 310 has a corresponding distance 340 between a focusing surface 320 of the GRIN lens 310 and the focus plane 330. This distance 340 for the GRIN lens is typically less than 0.25 millimeters. A GRIN lens 310 typically has a CTE of less than $10 \times 10^{-6}$/C.

The GRIN lens 310 may not be preferred for high power applications because of irreversible property changes of the dopants during its operation. These dopants may be introduced into the GRIN lens 310 as a result of continuous long-term exposure to intense light.

Figure 4:
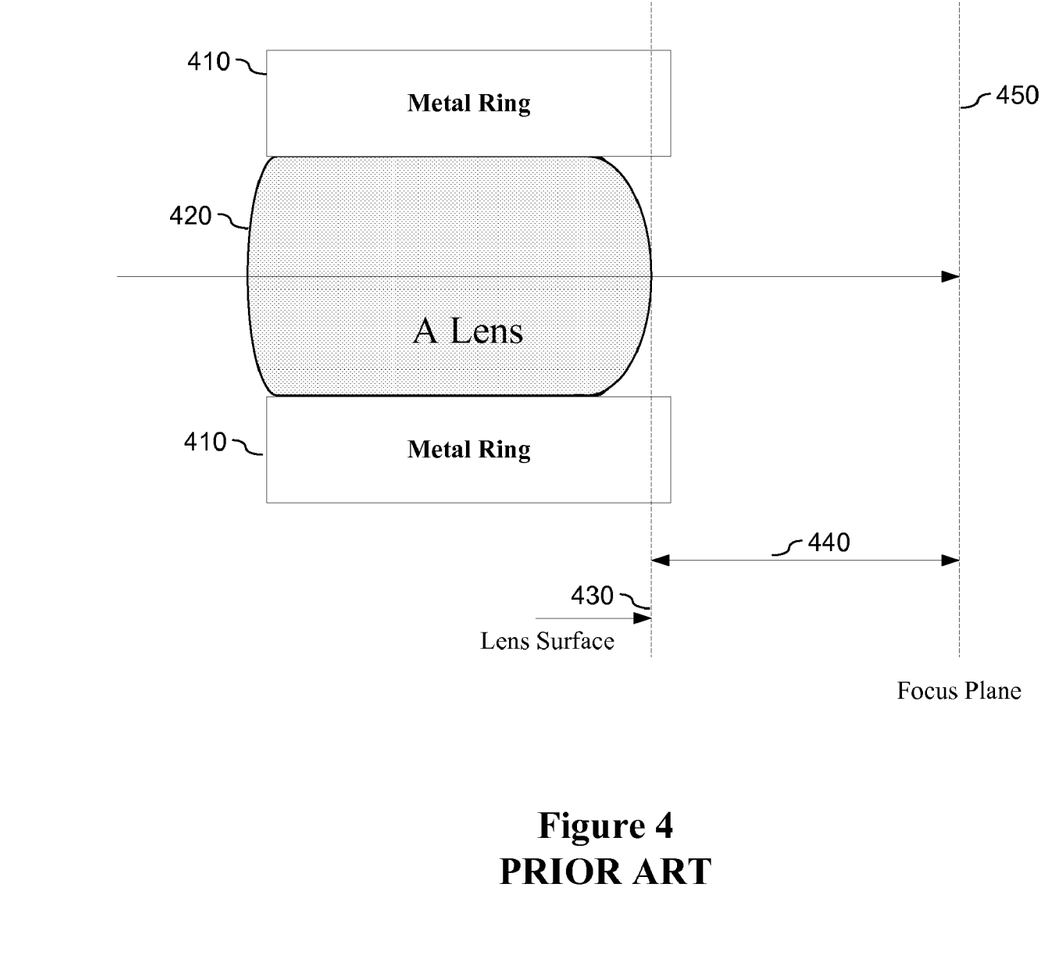
FIG. 4 is an illustration of an A lens and certain optical characteristics thereof.

FIG. 4 illustrates an exemplary A-lens that may be used within the optical tap filter. The A-lens 420 is surrounded by a metal ring 410 and receives an incident light beam which it focuses on a focus plane 450. The A-lens 420 has a focus length 440 that is defined as the distance between a focusing surface 430 of the A-lens 420 and the focus plane 450. The focus length 440 for the A-lens 420 is typically about 1.9 millimeters.

The use of an A-lens within a tap filter increases the relative manufacturing cost of the device. This increase in manufacturing cost is caused by the physical structure of the A-lens. Additionally, the A-lens has a relatively longer focus length 440 which may negatively affect the size of the filter.

Accordingly it is desirable to provide an apparatus and method that address the limitations of the prior art.

SUMMARY OF THE INVENTION

A glass optical reflective tap is described that optically connects two optical fibers and may tap a portion of the light that is being communicated between the optical fibers. In one embodiment of the invention, the optical filter includes two D-lenses that operate as focusing or collimator lenses. The first D-lens focuses an optical signal onto a tap filter that allows a majority of the light within an optical signal to pass and also reflects a small portion of optical signal light to a reflective port. The second D-lens focuses the passed light into a transmission port of an optical fiber.

The glass housing may be comprised of two glass pigtail tubes and a glass center piece tube that are secured by an epoxy that secures the three tubes together after curing. In one embodiment of the invention, the inner diameters of the pigtail tubes are smaller than the inner diameter of the center piece tube so that additional space is provided for alignment of pigtails to focusing lenses. Additionally, a glass tube package may be used to surround the secured tubes. In one embodiment, the glass housing protects and secures two D-lenses that operate as focusing lenses, a tap chip and tap filter holder. A first D-lens focuses an incident light signal on a tap filter which passes the majority of optical power within an optical signal and reflects a minority of the power within the optical signal back to a reflective port. A second D-lens focuses the passed or non-reflected optical signal portion into a transmission port of an optical fiber pigtail. The first D-lens may be used to also focus the reflected optical signal portion into the reflective port in a corresponding fiber pigtail.

The glass optical reflective tap offers significant performance advantages, compliance with RoHS and other standards, and is less expensive than its metallic counterparts. The glass optical reflective tap has a relatively lower coefficient of thermal expansion and thus is less sensitive to temperature change. Additionally, the glass material comprising the pigtail and center piece tubes, and the epoxy material used to secure the tubes, does not contain metallic substances. Accordingly, the glass optical filter is complaint with standards relating to hazardous material.

The D-lenses also offer distinct advantages in their combination with the glass housing. In particular, the D-lens focus length allows for a relatively compact design of the glass optical reflective tap. The D-lens also allows for different angles of a pigtail depending on whether a single or dual fiber pigtail is used.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A glass optical reflective tap is described that optically connects two optical fibers and may tap a portion of the light that is being communicated between the optical fibers. In one embodiment of the invention, the optical filter includes two D-lenses that operate as focusing or collimator lenses. The first D-lens focuses an optical signal onto a tap filter that allows a majority of the light within an optical signal to pass and also reflects a small portion of optical signal light to a reflective port. The second D-lens focuses the passed light into a transmission port of an optical fiber.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different devices including optical systems such as WDM networks and components therein. The embodiments of the present invention may also be present in glass and substances having similar properties of glass. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Optical Filter Overview

Figure 5:
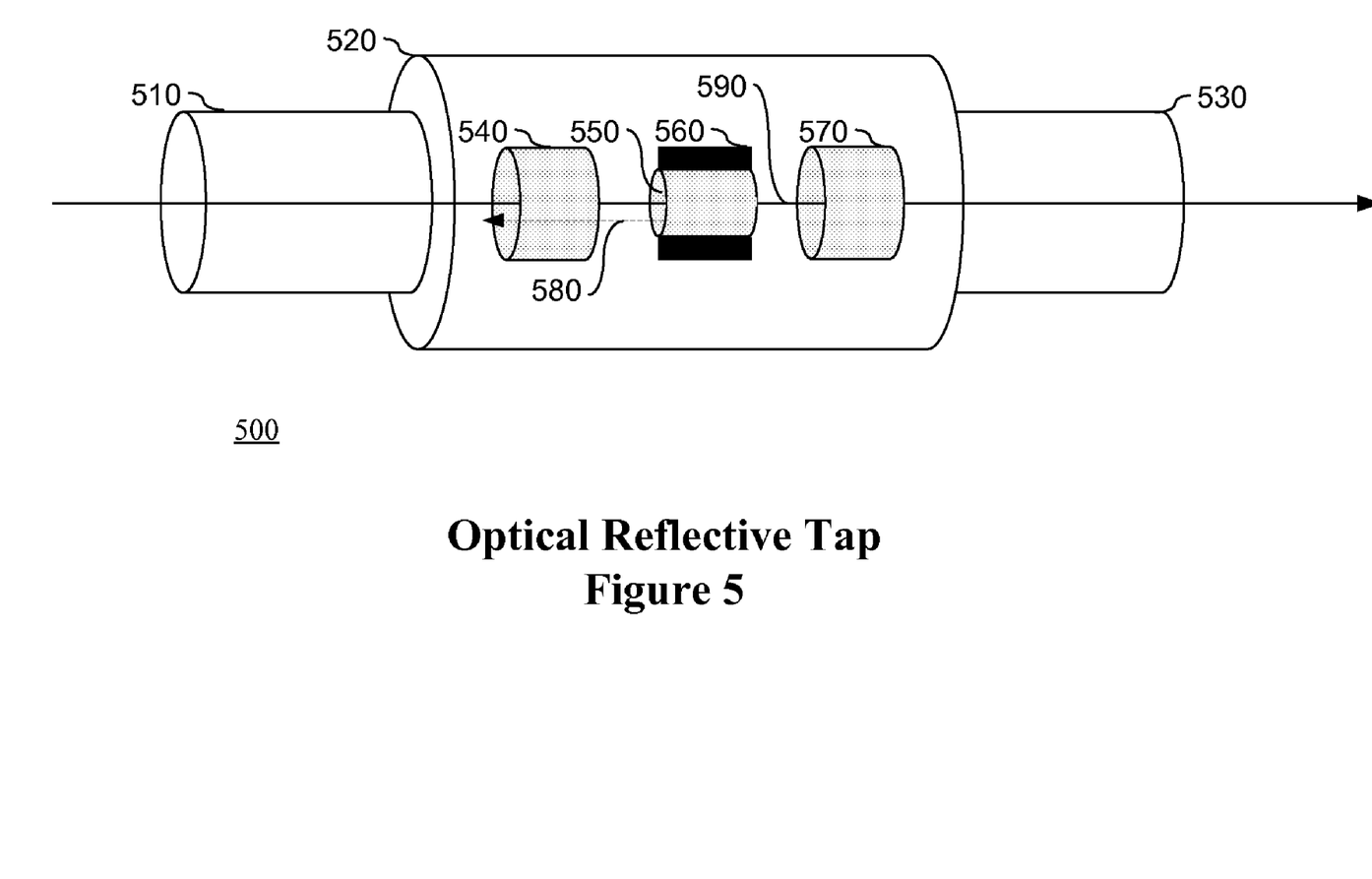
FIG. 5 is a cross-sectional illustration of an optical multimode reflective tap according to various embodiments of the present invention.

FIG. 5 is a cross-sectional illustration of an optical reflective tap, which may be used to tap a WDM signal and optically couple a dual fiber pigtail and a single fiber pigtail, according to one embodiment of the invention. The optical reflective tap 500 has a housing comprised of glass or another substance with similar characteristics of glass. The housing has a first pigtail tube 510, a center piece tube 520, and a second pigtail tube 530. The three tubes may be secured by using an epoxy resin that couples the tubes together after the resin is cured.

The housing surrounds a plurality of optical components that are used to tap an optical signal. In one embodiment, the optical reflective tap 500 reflects a small portion of light from a WDM signal to a reflective port for subsequent analysis. The first pigtail tube 510 surrounds an optical dual fiber pigtail in which an optical signal is communicated. The optical signal passes through a first focusing lens 540, comprising a D-lens, which focuses the incident optical signal onto a tap filter 550. The tap filter 550 is secured by a filter holder 560 within the center piece tube 520. The tap filter 550 is designed to pass a majority of the light 590 of the optical signal and reflect a minority of the light 580 back to the reflective port.

The majority of the light 590 is focused by a second focusing lens 570, comprising a D-lens, onto a transmission port of a single fiber pigtail that is secured within the second pigtail tube 530. The optical signal is then communicated within the single mode fiber.

In one embodiment, the tap filter 550 reflects a minority of the light from an optical signal back into a receptive port in the dual fiber pigtail. This reflected light may be communicated in one of multiple receptive ports within the dual fiber pigtail. This reflected light may be converted into the electrical domain by an optical-to-electrical converter and processed. For example, a power level on the optical signal may be determined from this processing operation. One skilled in the art will recognize that various types of tap filters may be used within the optical reflective tap including a grating-based filter.

In another embodiment, the optical reflective tap 500 optically couples a single mode fiber to another single mode fiber. In yet another embodiment, the optical reflective tap 500 optically couples a dual mode fiber to another dual mode fiber. One skilled in the art will recognize that the optical reflective tap 500 may optically couple different types of optical fiber with varying optical characteristics.

The optical reflective tap 500 is less sensitive to temperature changes because of the temperature characteristics of the glass housing. In one embodiment, a glass borate compound is used to manufacture the three tubes 510, 520, 530. This compound has a relatively low CTE resulting in less physical expansion/contraction of the housing relative to temperature changes, which results in better temperature stability of the optical reflective tap 500.

The glass housing offers other advantages its metallic counterpart. For example, the glass housing is manufactured without using high temperature processes, such as soldering, resulting in a low stress manufacturing environment and providing reliability over a relatively long period of time. Additionally, the glass compound is relatively less expensive than its metallic compounds. Furthermore, because the housing does not contain metallic substances, the optical filter is RoHS compliant.

Figure 6:
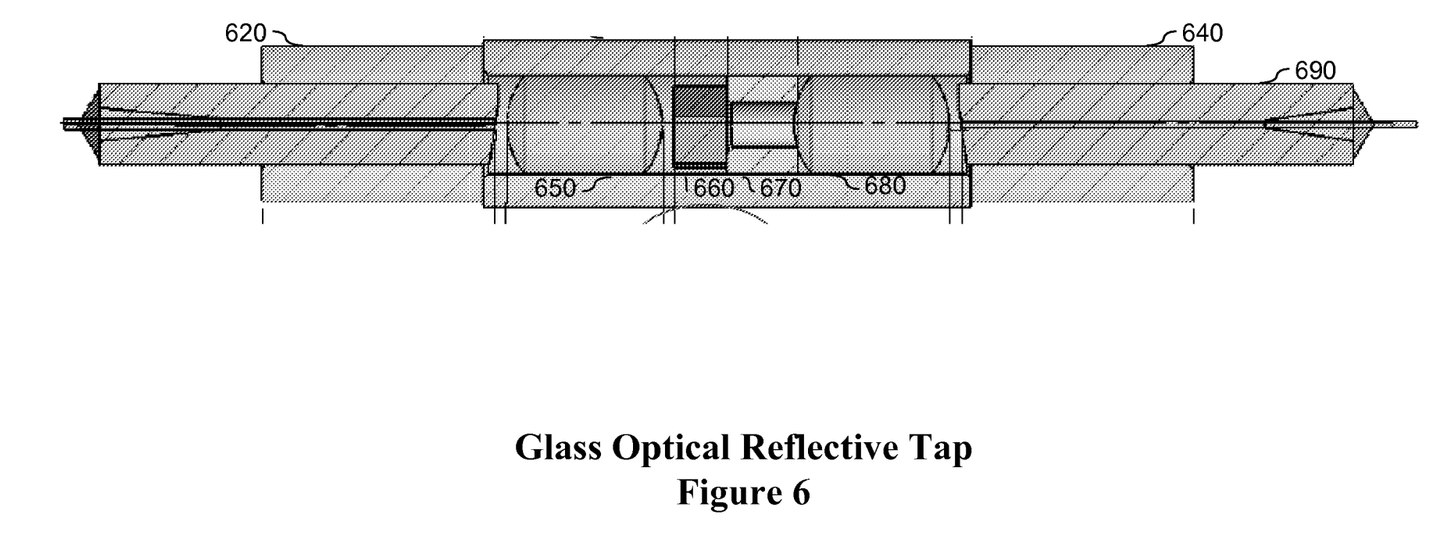
FIG. 6 is a cross-sectional illustration of an optical multimode reflective tap which includes a D lens according to various embodiments of the present invention.

FIG. 6 is a more detailed cross-sectional illustration of an optical reflective tap according to various embodiments of the invention. In one embodiment, the optical reflective tap 600 is approximately between 26 and 27 millimeters. A first and second pigtail tubes 620, 640 are approximately 5 millimeters, and a center piece tube 630 is approximately 9 millimeters.

Gaps between fiber pigtails 610, 690 and D-lens focusing lenses 650, 680 are approximately 0.23 millimeters. A tap filter chip is approximately 0.30 millimeters and filter holder is approximately 1.10 millimeters. In one embodiment of the present invention, the diameter of the center piece tube 630 is larger than the diameters of the first pigtail tube 620 and the second pigtail tube 640. This difference in diameters provides for more additional space for alignment of fiber pigtail and focusing lens. For example, the first pigtail tube 620 and the second pigtail tube 640 have inner diameters of 1.8 millimeters, and the center piece tube 630 has an inner diameter of 2.2 millimeters. One skilled in the art will recognize that various different inner diameters between pigtail tube and center piece tube may be used to adjust or enhance the alignment capabilities of the optical reflective tap 600.

B. Focusing Lenses

Figure 7:
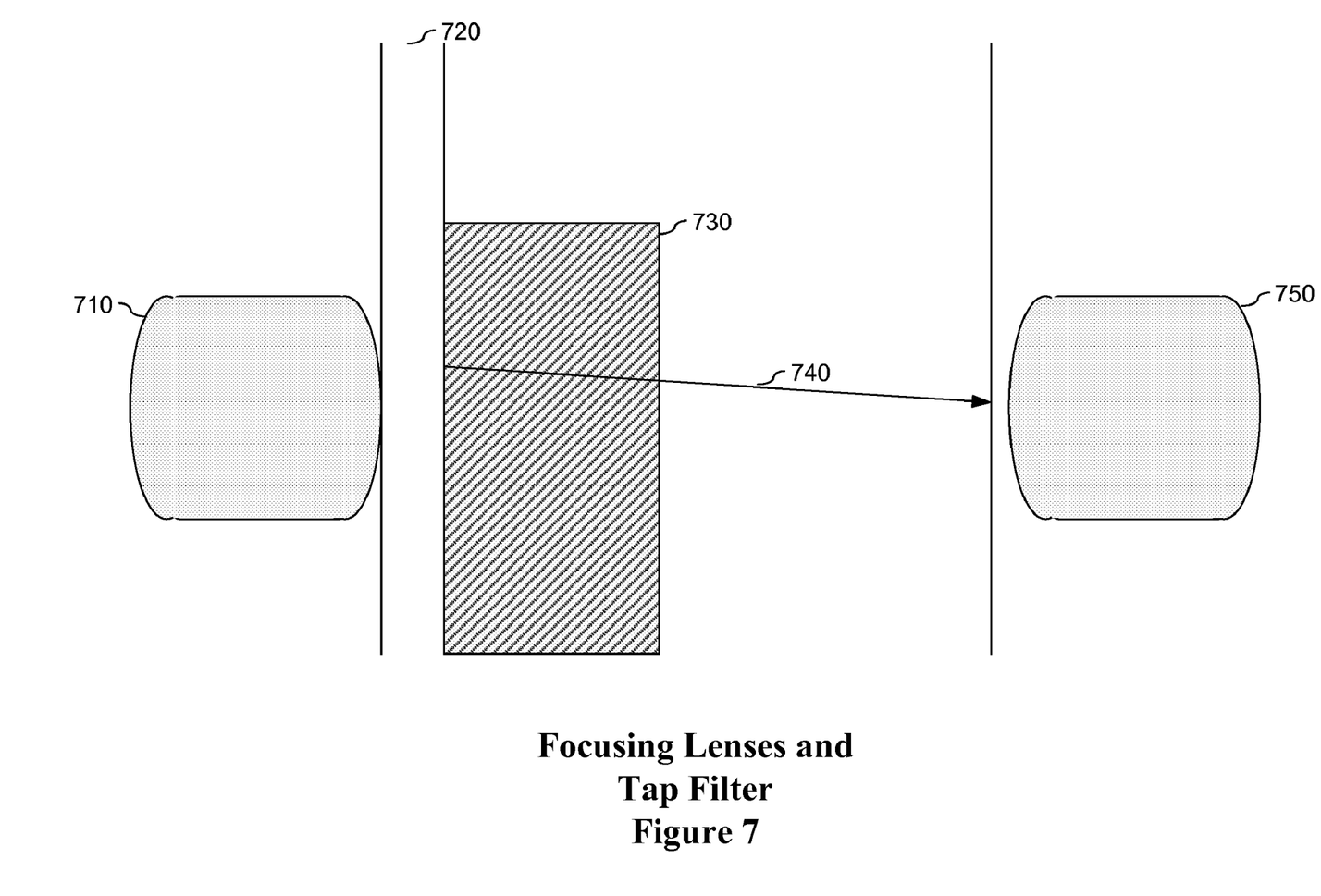
FIG. 7 is an illustration of optical lenses and tap filter according to various embodiments of the invention.

FIG. 7 illustrates a tap filter and focusing lenses according to various embodiments of the present invention. In one embodiment of the invention, a first focusing lens 710, a D-lens, is positioned relative to a tap filter 730. A gap 720 between the first focusing lens 710 and the tap filter 730 provides a focus length in which an incident light beam is focused on a focal plane at the tap filter 730. In one embodiment of the invention, the gap 720 is approximately 0.25 millimeters.

A filtered beam 740, having a beam incident angle at the tap filter 730 is defined so that the beam may reach the focus plane of a second focusing lens 750, another D-lens. In such a situation, additional walk-off is produced and if no compensation is provided then a loss will occur on a transmission port of the corresponding filter. In one embodiment of the invention, angles of a dual fiber pigtail and a single fiber pigtail are provided to compensate a walk-off of non-4f system. For example, an 8 degree dual fiber pigtail angle and an 8 degree single fiber pigtail are employed.

The second focusing lens 750 focuses the focused incident light beam into a transmission port of an optically coupled pigtail. Reflected light from the tap filter 730 is focused by the first focusing lens 710 into a reflective port of another optically coupled pigtail.

Figure 8:
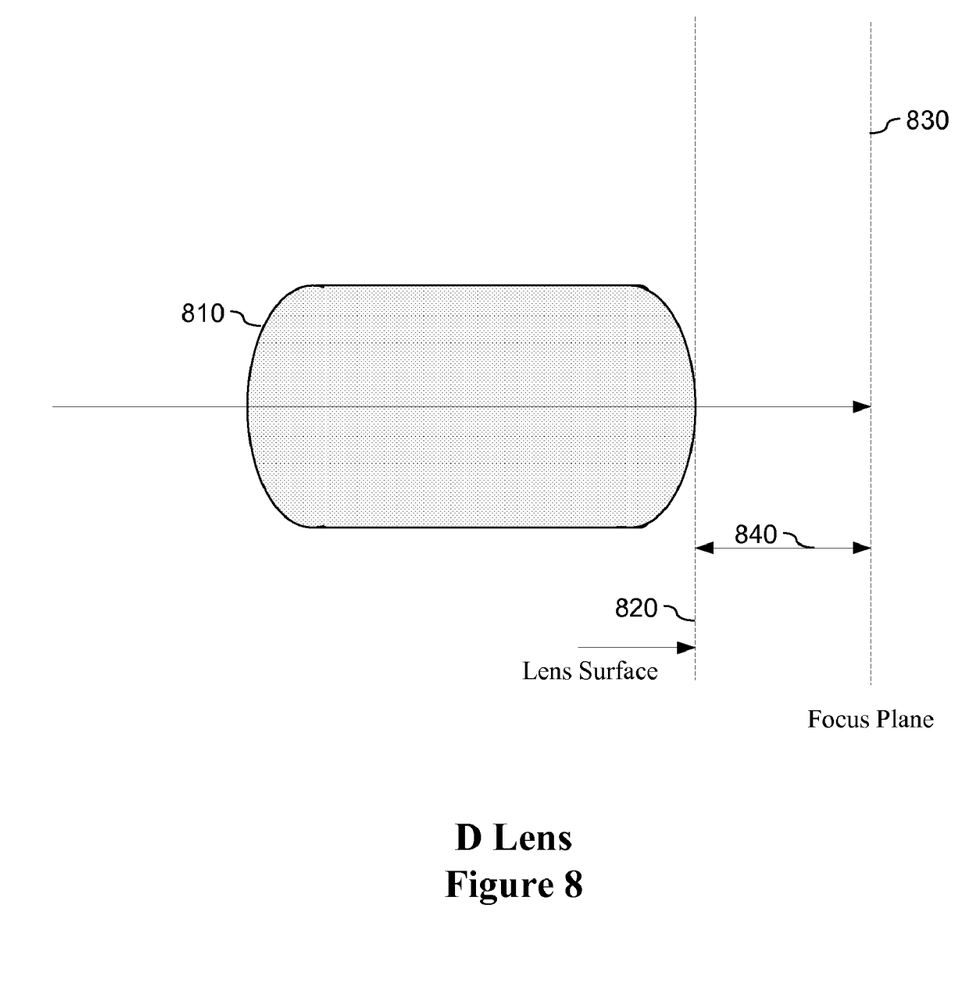
FIG. 8 is an illustration of a D lens and certain optical characteristics thereof according to various embodiments of the present invention.

FIG. 8 illustrates a D-lens and corresponding optical characteristics of the D-lens. In one embodiment of the invention, the D-lens 810 has a corresponding distance 840 of approximately 0.25 millimeters, which is defined as the distance between a lens surface 820 and a focus plane 830. This distance 840 is relatively small which facilitates a more compact design of a corresponding optical filter.

In one embodiment of the invention, the optical axis of the D-lens 810 is the same as its physical axis. This alignment of optical and physical axes reduces the tolerance caused by the lens to be approximately zero. Additionally, the D-lens 810 does not have a polish angle making it simpler to assemble because it does not need a special process to match the angles of a lens and pigtail. Furthermore, the D-lens 810 is made from a glass ball so that the outer diameter of the lens is easy to change according to a customer's requirement. Unlike the GRIN lens, which focuses light by a change of index within the lens (the GRIN lens is a gradual non-constant index lens), the D-lens 810 function is realized by one or two curved planes on the lens itself.

Figure 9:
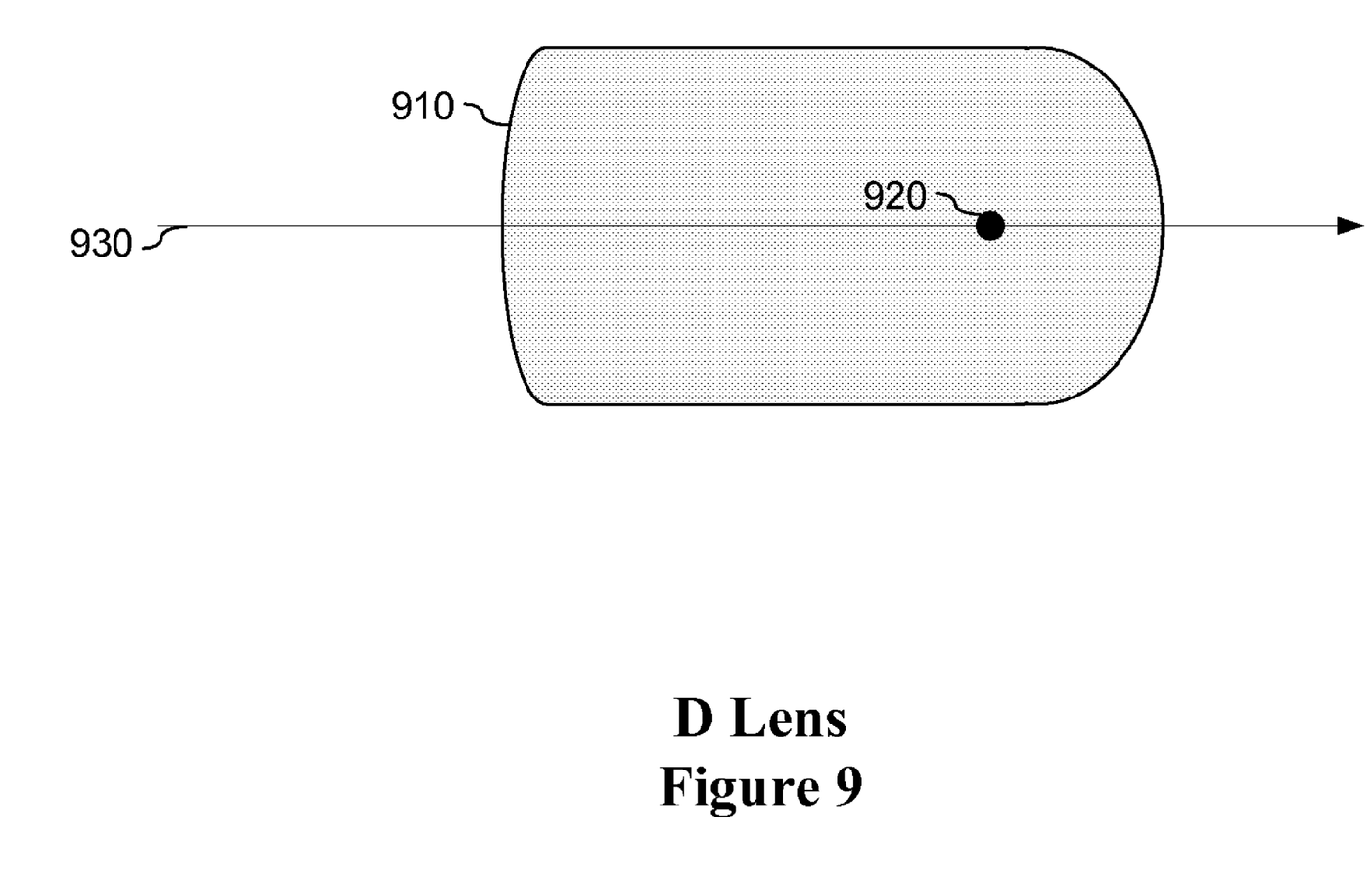
FIG. 9 is another illustration of a D lens and other optical characteristics thereof according to various embodiments of the present invention.

FIG. 9 illustrates a D-lens and optical performance characteristics according to one embodiment of the invention. As shown, a D-lens 910 has that focuses an incident light beam on a focus plane (not shown). The D-lens center 920 is located at the axis 930 of the lens so that there is not a shift between the axis 930 and ball center 920.

Other lenses, such as GRIN lenses and C-lenses, have a mismatch between the lens center and axis, which results in internal loss within the lens. For example, a C-lens is polished from a glass bar, which results in the center of the corresponding lens ball not being located at the axis of the bar. This mismatch is often caused by process deviation and causes optical light to not be parallel with the axis after passing the lens, which causes extra insertion loss in the design.

Comparatively, a D-lens is polished from a ball with its center located at the axis of the lens bar. Accordingly, the insertion loss described above is not present in the optical filter employing D-lenses as focusing lenses.

Figure 10:
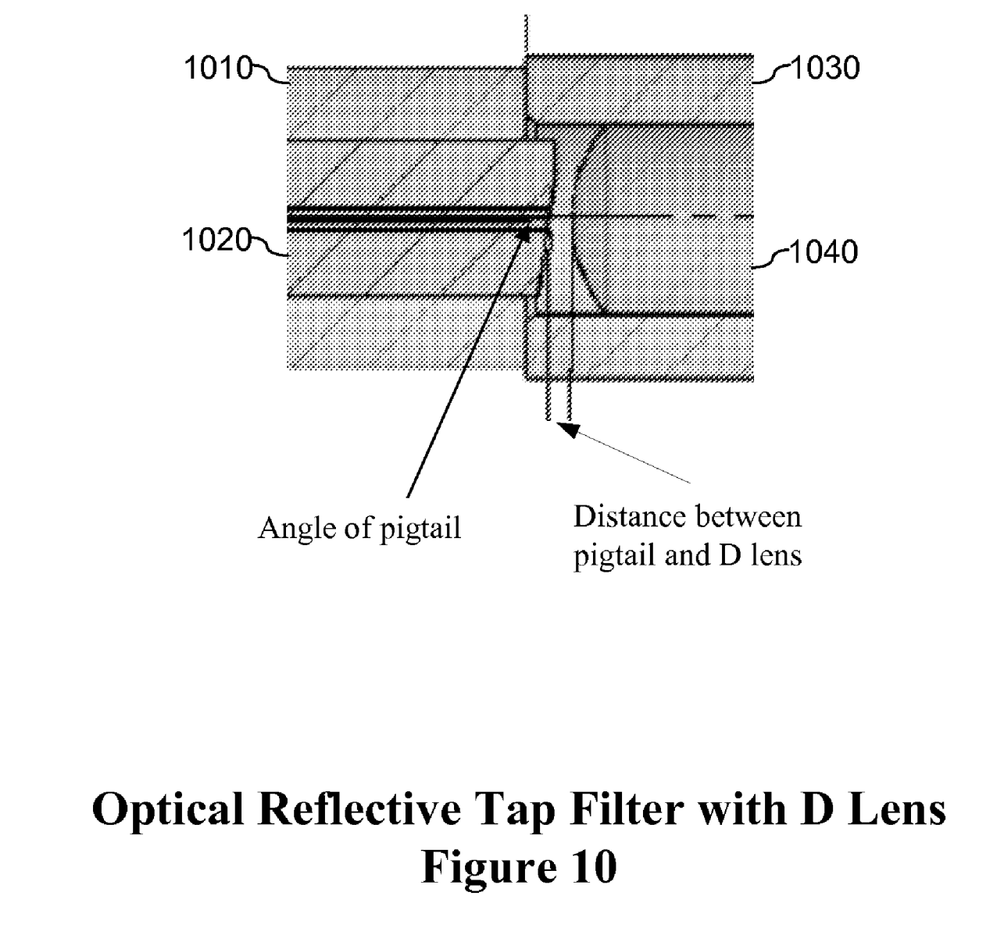
FIG. 10 is an illustration of a D lens and its coupling within an optical reflective tap according to various embodiments of the invention.

FIG. 10 illustrates an alignment of a pigtail and focusing D-lens according to one embodiment of the invention. A pigtail tube 1010 surrounds an optical fiber pigtail 1020 which optically interfaces with a focusing D-lens 1040. The D-lens 1040 is surrounded by a center piece tube 1030 that protects and secures the D-lens 1040 in position.

As described above, the distance between the D-lens 1040 and the pigtail 1010 is relatively narrow due to the optical characteristics of the D-lens 1040. Additionally, there is no angle match required between the D-lens 1040 and the pigtail 1010 because the plane of the D-lens 1040 is a ball curve. However, if a C-lens or GRIN lens is used as the focusing lens, then a angles of the lens and the pigtail must be matched. Furthermore, as illustrated, the inner diameter of the pigtail tube 1010 is smaller than the inner diameter of the center piece tube 1030. These D-lens characteristics provide a more effective environment for alignment between a D-lens focusing lens and a pigtail.

While the present invention has been described with reference to certain exemplary embodiments, those skilled in the art will recognize that various modifications may be provided. Accordingly, the scope of the invention is to be limited only by the following claims.

We claim:

1. An optical reflective tap comprising:
    a glass housing comprised of a plurality of glass tubes;
    a first D-lens, positioned within the glass housing, that optically interfaces with a first fiber pigtail and focuses an incident light beam from the first fiber pigtail;
    a multi-mode reflective tap filter, positioned within the glass housing and relative to the first D-lens, that receives the focused incident light beam and passes a first portion of the incident light and reflects a second portion of the light, the first portion being larger than the second portion; and
    a second D-lens, positioned within the glass housing, that focuses the first portion of light into at least one transmission port in a second fiber pigtail.

2. The optical reflective tap of claim 1 wherein the glass housing comprises:
    a first glass pigtail tube that surrounds the first fiber pigtail;
    a second glass pigtail tube that surrounds the second fiber pigtail; and
    a glass center piece tube, coupled between the first glass pigtail tube and the second glass pigtail tube, that surrounds the tap filter.

3. The optical reflective tap of claim 2 wherein the first glass pigtail tube, the second glass pigtail tube, and the center piece tube are made of glass borate substances.

4. The optical reflective tap of claim 2 wherein the center piece tube is coupled to the first and second pigtail tubes by an epoxy resin.

5. The optical reflective tap of claim 2 wherein the inner diameters of the first glass pigtail tube and the second glass pigtail tube are smaller than the inner diameter of the center piece glass tube.

6. The optical reflective tap of claim 5 wherein the inner diameter of the first and second glass pigtail tubes is 1.8 millimeters and the inner diameter of the center holding piece is 2.2 millimeters.

7. The optical reflective tap of claim 1 wherein the first pigtail is dual fiber pigtail and the second pigtail is single fiber pigtail.

8. The optical reflective tap of claim 1 wherein the second portion of light is reflected to a reflective port on the optical reflective tap.

9. The optical reflective tap of claim 8 wherein the reflective port is coupled to a processing element that identifies an optical power level of the incident light beam.

10. The optical reflective of claim 1 wherein the first D-lens and the tap filter is separated by a gap of 0.23 millimeters.

11. A method of tapping an optical signal, the method comprising:
    focusing an optical signal, communicated in the first fiber pigtail, using a first collimating D-lens;
    passing a first portion of the optical signal though an optical tap filter;
    reflecting a second portion of the optical signal from the optical tap filter, the second portion being smaller than the first portion;
    focusing the first portion of the optical signal into a transmission port of the second fiber pigtail using a second collimating D-lens;
    focusing the second portion of the optical signal into a multi-mode reflective port and reflecting a second portion of the optical signal, the second portion of the optical signal being less than 25% of the first portion of the optical signal; and
    wherein the first and second collimating D-lenses are positioned within a glass housing.

12. The method of claim 11 wherein the first fiber pigtail is dual fiber pigtail and the second fiber pigtail is single fiber pigtail.

13. The method of claim 11 wherein the second portion of the optical signal is converted into a corresponding electrical signal.

14. The method of claim 13 wherein the corresponding electrical signal is processed to identify a power level on the optical signal.

15. The method of claim 11 wherein the glass housing is comprises:
    a first pigtail tube that surrounds the first fiber pigtail;
    a second pigtail tube that surround the second fiber pigtail;
    a center piece tube that physically couples the first pigtail tube and the second pigtail tube; and
    wherein the center piece tube is coupled to the first and second pigtail tubes by an epoxy resin.

16. The method of claim 14 wherein the inner diameters of the first and second pigtail tubes is smaller than the inner diameter of the center piece tube.

17. The method of claim 15 wherein the first and second pigtail tubes and the center piece tube is made of a glass borate substance.

18. The method of claim 11 wherein a gap of approximately 0.23 millimeters separates the tap filter and the first collimating D-lens.

19. The method of claim 11 wherein the tap filter is approximately 0.30 millimeters in length.

\* \* \* \* \*